United States Patent
Geschwender (10) Patent No.: US 7,543,493 B2
(45) Date of Patent: Jun. 9, 2009

(54) RAIN GAUGE

(76) Inventor: Robert C. Geschwender, 6301 Rolling Hills Blvd., Lincoln, NE (US) 68512

( * ) Notice: Subject to any disclaimer, the term of this patent is extended or adjusted under 35 U.S.C. 154(b) by 0 days.

(21) Appl. No.: 11/717,990

(22) Filed: Mar. 14, 2007

(65) Prior Publication Data

US 2008/0223126 A1    Sep. 18, 2008

(51) Int. Cl.
*G01W 1/00* (2006.01)
(52) U.S. Cl. .................. 73/170.17; 73/170.21
(58) Field of Classification Search ............. 73/170.17, 73/170.21
See application file for complete search history.

(56) References Cited

U.S. PATENT DOCUMENTS

| | | | | |
|---|---|---|---|---|
| 4,106,336 A * | 8/1978 | Marley | ............ | 73/170.17 |
| 4,233,841 A * | 11/1980 | Abele | ............ | 73/170.17 |
| 5,038,606 A * | 8/1991 | Geschwender et al. | ... | 73/170.17 |
| 5,505,082 A * | 4/1996 | Cushman et al. | ......... | 73/170.21 |
| 6,044,699 A * | 4/2000 | Greenblatt et al. | ....... | 73/170.17 |
| 6,363,781 B1 * | 4/2002 | Moore | ............ | 73/170.17 |
| 6,494,089 B1 * | 12/2002 | Geschwender | ......... | 73/170.21 |
| 6,609,422 B1 * | 8/2003 | Geschwender | ......... | 73/170.22 |
| 7,066,021 B1 * | 6/2006 | Noe | ............ | 73/170.17 |
| 7,152,468 B1 * | 12/2006 | Peterson | ............ | 73/170.17 |

* cited by examiner

*Primary Examiner*—Andre J Allen
(74) *Attorney, Agent, or Firm*—Vincent L. Carney (57) ABSTRACT

A cylindrical collector of the rain gauge has a vertical distinctively colored stripe extending parallel to its vertical axis a focal length from its central axis on the opposite side of the rain gauge from rainfall indications. With this arrangement, the rain water in the rain gauge appears to have the color of a stripe which makes the water height easier to see. An open end of a parallelopiped interface receives the rain and has an area larger than the cross sectional area of the cylindrical collector to which it supplies the rain it receives. The numerals on the rain gauge indicating rainfall are scaled in proportion to the ratio of the area of the open end of the interface and the cross sectional area of the cylinder for easier reading. The parallelopipe design was selected to reduce the size of the shipping container and the dimension perpendicular to the holder is less than the width to permit the gauge to lie flat against a surface for hanging.

34 Claims, 7 Drawing Sheets

RAIN GAUGE

BACKGROUND OF THE INVENTION

This invention relates to rain gauges.

Rain gauges are known that include a rain collector and large numerals and/or words indicating the height of the water in the rain collector. In this class of rain gauges, the rain collector has indications, such as numerals and lines to indicate the gradations of water height and the numerals are large enough to be read from several yards away. An adjusting mechanism referred to herein as an interface is mounted to the top of the collector to collect water from a wider area than the cross section of the rain collector so that the water rises at a multiple of the rainfall per square inch but in proportion to it so there is room for larger numerals on the rain collector itself to indicate the amount of rain per square inch that has fallen. The rain collector is a tube with a plug at the bottom and the interface at the top. The tube is removably mounted to a bracket for ease in fastening to an upright surface. This type of rain gauge is disclosed in U.S. Pat. No. 5,038,606 granted Aug. 13, 1991, to Robert C. Geschwender, et al. A float aids in seeing the height of the rain water in the rain collector.

While this prior art rain gauge operates well, there are several aspects of its operation that can be improved upon, such as: (1) it is somewhat difficult to read the height of the rain water in the collector from a distance, particularly at night; (2) the float is not as visible as desired; (3) to prevent leakage, an "O" ring is used, which increases the expense of manufacture or special costly efforts are needed to create a permanent water tight fit with the plug at the bottom of the rain collector; and (4) under some circumstances such as a heavy rain, the rain water overflows the interface.

In another type of prior art rain gauge, the collector is a uniform cylindrical tube which receives rain through the open top so that the rain rises in the cylindrical rain container in proportion to the inches of rainfall. The cylindrical rain container is mounted against a flat surface that has lines printed on it at intervals indicating the inches of rainfall. As the rain rises in the cylindrical rain container, it magnifies the lines seen through the water out of proportion to any distortion of the lines behind the part of the cylindrical rain container not having water to indicate with a distinctive line the level of rain. On the flat card, the inches of rain are indicated. This prior art rain gauge has the disadvantages of still being difficult to see from a distance because of its non-expanded vertical scale and the narrow diameter of the cylindrical rain container and because, in fog or at night, the numerals are difficult to read.

SUMMARY OF THE INVENTION

Accordingly, it is an object of the invention to provide a novel rain gauge.

It is a further object of the invention to provide a novel technique for measuring rain.

It is a still further object of the invention to provide an exceptionally easy-to-read rain gauge.

It is a still further object of the invention to provide an easy to read rain gauge that is particularly economical.

It is a still further object of the invention to provide a rain gauge which may be mounted either to an upright separate support such as a fence or separate post or in the alternative, may be mounted directly to the ground such as in a lawn or in a garden.

It is a still further object of the invention to provide an easy to manufacture rain gauge with a minimum number of parts.

In accordance with the above and further objects of the invention, a rain gauge includes a clear tube serving as a rain collector with a front surface facing the viewer and a back surface facing a mounting bracket. The front surface has indicia indicating rain levels and the back surface faces a longitudinal stripe, sized and spaced from the tube in a manner to create contrast between the portion of the tube filled with water and the portion that is empty. This stripe is hereinafter referred to as a contrast stripe.

In the preferred embodiment, the contrast stripe is a colored stripe that runs parallel to the rain collector. However, it can be discontinuous such as being made up of a geometric pattern and can include reflective material to reflect light and illuminate the tube. The thickness of the wall of the cylinder, the radius of curvature of the cylinder, the width of the stripe and the distance the stripe is spaced from the surface of the cylinder are set so that, as the cylindrical rain container fills with water, the contrast stripe provides a distinctive portrayal of the height of the water. Preferably, the contrast stripe is colored so that the water in the rain collector assumes the color of the contrast stripe to clearly indicate the height of the rain water in the rain gauge. In the preferred embodiment, the wall thickness is no greater than fifteen percent of the outer diameter of the cylinder. The vertical contrast stripe has a width of about a quarter of that of the diameter of the cylinder and is spaced from the cylinder a distance of about one-third that of the width of the distinctive colored contrast stripe.

Advantageously, the vertical contrast stripe may be part of a bracket that holds the rain collector. At the top of the rain collector, there is a rain catching section with an opening larger than the inside diameter of the cylinder to collect rain in proportion to the ratio of the area of the rain catching section to the area of the cylinder, and thus, permit the cylinder to be longer and include larger numerals. This rain catching section is referred to as an interface. The contrast stripe is placed between the cylindrical rain collector and the focal point of light passing from the front of the gauge: its width, when positioned, matches the width of the rays forming the focal point at that location.

In this specification, the words "focal point" refer to the focus of points a focal distance from the central axis of the rain collector in a plane passing through the central axis of the rain collector and the contrast stripe. Generally, the contrast stripe in the preferred embodiment is spaced from the center of the cylindrical rain container of rain water a distance where the stripe is on a bracket of sufficient size to support the rain gauge. If the cylindrical rain container of rain water is an ellipse rather than a cylinder, the location of the contrast stripe is adjusted accordingly to the change in the focal point of the ellipse. Preferably, the contrast stripe is located so that the light reflected from it to the rain water in the rain collector is collimated. A float may be positioned within the cylinder but is not necessary.

The bracket is designed to permit the cylinder to be mounted in the ground or to a flat surface. The cross section of the interface is preferably rectangular or elliptical and its longest dimension is usually parallel to the gauge. However, the interface can be turned and it is positioned for convenience in packing. Generally, it is shaped and positioned to save space during packaging. In the preferred embodiment, the interface is rectangular so that it minimizes the space required for storage, shipping and display. With this arrangement, the cylindrical rain container may be easily stacked side by side in layers for shipment or mounting on a flat display (such as hanging from a hook) facing the customer. The bracket includes openings to permit mounting of a rain gauge to a flat surface such as a post or a fence and a bottom pointed end to permit fastening into the ground such as in the backyard or in a garden. The bracket may have a simple ring at the top and a directional holder at the bottom to position the indicia facing to the viewer of the gauge.

To permit easy reading of the rainfall at a distance, the interface means intercepts rain falling through a larger area than the upper surface area of the rain collection cylinder. The indicia includes an expanded scale so that if rain is indicated in inches, the indicia has its inch marks spaced vertically further apart to correlate with the height of the water. The scale of the indicia includes dimension marks that are spaced apart a distance equal to the corresponding dimensional units of the amount of rain that has fallen multiplied by the whole number or a fraction, so that for example, the scale has a multiple of the actual dimensions of rain. The numerals or letters indicating the amount of rain that has fallen are at least one-half inch high in height and at least three/thirty-seconds inch in width with the lines forming the individual digits being at least three/thirty-seconds inch wide to provide clear visibility.

The rain gauge has a larger than standard scale with a funnel type interface rain collector which has an opening cross sectional area larger than the cross sectional area of the gauge. The ratio of the cross sectional area of the interface to that of the cross sectional area of the gauge cylinder is directly proportional to the increased size of the larger scale to that of a standard rain gauge scale thus improving the readability of the gauge at a distance. A mounting bracket allows easy removal of the gauge for dumping of the water collected. At the bottom of the interface, it has spaced apart openings to permit the water to flow easily into the cylindrical rain container and the outer cylinder portion of the funnel of the interface fits within the inner diameter of the cylinder and slants inwardly so that the water from the collector flows inward and down through the openings. The interface can be easily removed from the cylinder for cleaning of the gauge. Advantageously, the holes are at different depths in the funnel to permit easy escape of air. The upper end of the funnel is rectangular and adapted to lie in a plane orthogonal to the longitudinal axis of the gauge cylinder.

A remarkably synergistic relationship has been found between the diameter of the rain collector, the spacing of the support bracket for the rain gauge, the colored stripe, and the thickness of the walls of the rain collector. The rain collector is shaped as a cylinder so that as it fills with rain, the filled portion of the cylinder is a column of water forming a biconvex lens together with the thickness of the walls of the cylinder. (the cylinder with rain water in it is hereinafter referred to as a vessel). It has been discovered that the focal point of a rain gauge which has sufficient size for clearly visible letters or other indications at a distance provides a focal point sufficiently close to the outer wall of the rain gauge with an economically formed wall thickness so that a support bracket having the colored stripe in front of it or painted on its side facing the cylinder is of reasonable length so that it can support the rain gauge without excessively strong extending members and yet have the colored stripe either on it or in front of it at a location that will provide a colored column up to the height of the water but not above it. Moreover, with a reasonable thickness of the wall of a container made of a suitable material, the image of the colored stripe is not so noticeable as to distract from the detection of the water level. If the focal point had been too distant then the arms of the bracket supporting the rain gauge would have to be uneconomically long and would provide insufficient strength because of its leverage. Instead, the dimensions surprisingly provide a near optimum structure.

As can be understood from the above summary, the rain gauge of this invention has several advantages, such as: (1) it is easy to read from a distance; (2) it is easy to determine the level of the liquid in the cylinder; (3) it may be either mounted to a vertical surface or in the ground; and (4) it is particularly economical.

BRIEF DESCRIPTION OF THE DRAWINGS

The above noted and other features of the invention will be better understood from the following detailed description when considered with reference to the accompanied drawings, in which.

DETAILED DESCRIPTION

Figure 1:
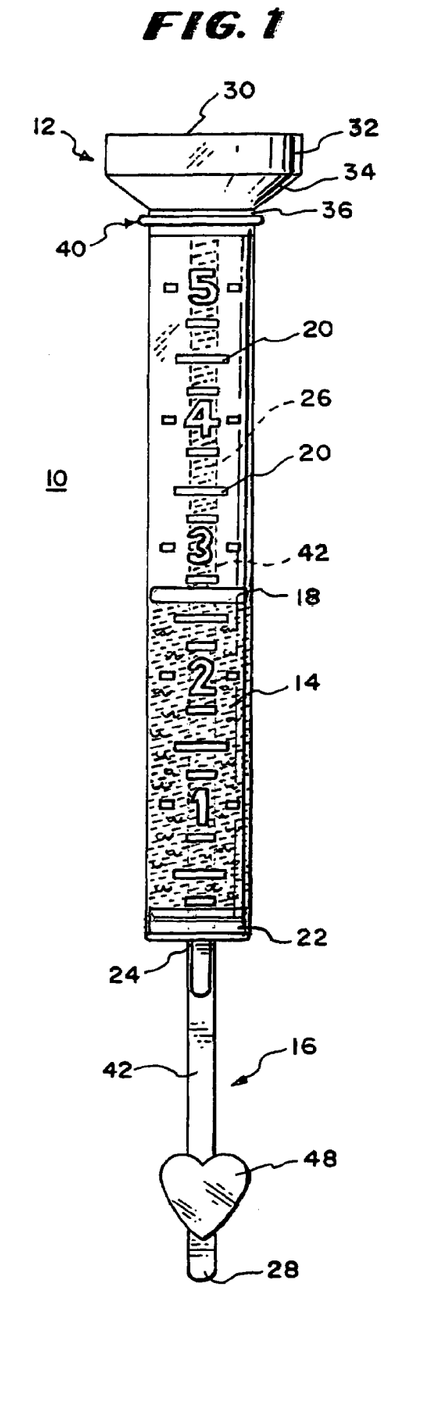
FIG. 1 is a front elevational view of a rain gauge in accordance with an embodiment of the invention.

In FIG. 1, there is shown a front elevational view of a rain gauge 10 having an interface 12, a container or tubular body 14 serving as a rain collector and a mounting bracket 16. The container 14 has its upper end opening upwardly where it receives the interface 12, and includes a plug 22 at its lower end to hold rain water within it, and in the preferred embodiment, contains a float 18 (float is not shown in FIG. 1, shown in FIG. 12) within it. With this arrangement, rain is intercepted by the interface 12 and flows into the container or body 14. The surface of the rain water in the container 14 rises in proportion to the amount of rain which has fallen and has been received by the interface 12. The container or body 14 has a water tight bottom and sides to contain rain water and is sized and shaped to cooperate with the float 18 (FIG. 12), the interface 12, indicia markers 20 and the colored contrast stripe 26 to indicate the amount of rain. In the preferred embodiment, the float 18 (FIG. 12) is carried by the rain water on its upper surface to aid in locating the upper surface.

The interface 12, the container or body 14 and float 18 (FIG. 12) are arranged to be supported by the mounting bracket 16 on a post or a fence or to be mounted to the ground by the bottom end of the bracket 16. The bracket 16 includes a vertical support strip 42 which includes a convenient point 28 for easy insertion into the ground. A decorative design 48 such as a heart or leaf is formed on the bracket 16 and also serves to more firmly hold the rain gauge 10 in the ground. The support strip 42 of the bracket 16 includes a vertical colored stripe or contrast stripe 26 having a width that colors the entire cylindrical rain container 14 when viewed from the front up to the surface of the water with the proper space 46 (not shown in FIG. 1; shown in FIG. 2) between the colored stripe and the surface of the container closest to it. This occurs because of the magnifying power or light collimating effect of the container at locations that are full of water. On the other hand because of the lack of magnifying power of the rain container at locations not containing water, the colored stripe is seen as a narrow stripe or line.

The column of rain water in the rain container 14 serves as a light collimating lens. In this specification, the words, "light collimating lens" means a lens that provides an image of an object at the rear of the column equal to the diameter of the lens at all points on the opposite side of the lens from the object where water is contained. In this specification, a colored stripe placed near the rear of the column of water forming the lens changes the color of the image of the lens to the color of the stripe.

With this arrangement, the amount of rain is indicated in a manner that can be read more clearly than in conventional rain gauges because: (1) the float 18 (FIG. 12) reaches a level that is proportional to the amount of rain but greater than the height of rain water collected in a conventional rain gauge or the amount of rain in a uniform container; (2) the colored nature of the cylindrical rain container 14 is clearly visible; (3) the contrast stripe 26 may be reflective so that at night if a light shines on the cylindrical rain container 14, the cylindrical rain container 14 is illuminated so that the colored portion is clearly visible as well as the numbers indicating the level of the water; (4) the interface 12 receives an amount of water proportional to the rain and causes the water to flow into the container 14; (5) the level of rain water in the rain container 14 rises to a higher level than it would in a standard rain gauge or in a container not having the interface; (6) the indicia 20 are larger and spaced further apart than in a conventional rain gauge and the space between each pair of numbers comprising the indicia indicating the level of rain is greater than the difference between the amount indicated by the corresponding pair of numbers of a conventional rain gauge; and (7) the float 18 (FIG. 12) provides a more visible indication of the level of the top of the rain water than only an air-water interface.

Throughout this specification, the amount of rain that has fallen is indicated in a conventional manner by the number representing the height of the water in inches in a container, which water would be collected if the falling water were captured in the container in such a way as to represent an average of the rain falling over a large area. It is assumed that the container capturing the rain is positioned so that the rain hitting the container represents a cross section of the rain orthogonal to its path, which in the case of a windless day, would be a horizontal opening for a container positioned to receive vertically falling rain and having perfectly vertical sides and a horizontal bottom to faithfully represent the amount of rain that is falling. This number reflects the volume per square inch of rain that has fallen and is normally used in reporting the amount of rainfall. The number may be in any convenient unit such as inches or millimeters or like.

The mounting bracket 16: (1) is able to support the container or body 14 either on a vertical surface or directly on the ground; (2) easily receives the container or body 14; (3) holds the cylindrical rain container 14 aligned with the indicia 20 facing outwardly in upward position; (4) is inexpensive; (5) contains an interlock means which causes the indicia or markers 20 to face forwardly when the container 14 is received by the mounting bracket 16; and (6) permits easy removal of the container 14 for emptying and replacement. In the preferred embodiment, the container or body 14 is a cylindrical and transparent tube of ultraviolet light resistant polycarbonate open at least at one end. It has a circular wall approximately 1/32 inch thick but no greater than fifteen percent of that of the inner diameter of the cylinder. The cylindrical rain container 14 has an inner tubular diameter of approximately one and three-quarters inches and is thirteen and a half inches long. It is closed at its bottom end by a separate plug 22 that is inserted into it and has a central pocket or opening within an upwardly extending hollow post 62 (FIG. 10) to receive a positioning bracket bottom member.

While the container or body 14 is made in two parts, which are the tubular cylindrical transparent plastic tube portion and the bottom closing plug 22, it could be made as one piece. However, there are cost advantages to making the two items separately. Moreover, it need not be cylindrical nor of any specific diameter or length except that it must be sized in relation to the inlet of the interface 12 and the indicia or markers 20 so that the float 18 (FIG. 12) is lifted, and an indication is made on the indicia or markers 20 of the correct amount of rainfall.

Preferably, the inner cross sectional area of the cylindrical rain container 14 is smaller by a fixed constant amount than the cross sectional area of an interface opening 30 so that the indicia or markers 20 may be spaced from each other regular distances for equal amounts of rain height. While a polycarbonate tube is used in the preferred embodiment for the container 14, any other suitable transparent material may be used including other plastics and glass. The scaling factor (proportionality constant) of the indicia 20 to the actual amount of rainfall is equal to the ratio of the cross sectional area of the opening 30 of the interface 12 to the cross sectional area of the container 14.

In the preferred embodiment, the indicia or markers 20 are printed onto the outer surface of the cylindrical rain container 14, being scaled in inches 2.465 inches apart center to center so that the vertical distance between one inch indicia and two inches indicia is 2.465 inches. Similarly, the difference between each of the other indicia or markers 20 is 2.465 inches. Of course, any other distance may be established by changing the ratio of the opening of the interface 12 to that of the container 14. The size of the letters in the preferred embodiment are 0.6 by 0.75 inch. Intermediate between adjacent digits at 1.233 inches apart are one-half inch markers. One-quarter inch markers are spaced 0.616 inch from the adjacent one-half inch markers. The walls of the cylindrical rain container 14 are formed of a material that receives printing easily. One such material is polycarbonate. A suitable light passing polycarbonate is sold under the trademark Lexan by General Electric Company. This material has sufficiently high creep and relaxation moduli so that interference fit parts retain their leak resistant characteristics.

While in the preferred embodiment, the scale inch designations for the rain that has fallen are printed in color directly onto the transparent cylindrical rain container 14, they may be mounted separately adjacent to the cylindrical rain container 14. However, the use of a colored vertical contrast stripe that colors the cylindrical rain container 14 up to the height of the rain water is advantageously simple, low cost and provides clear visibility. This is especially true at night if a reflective vertical contrast stripe 26 is used.

In the embodiment of FIG. 1, the interface 12 serves as an initial collector of rain and includes a rectangular upper top interface opening 30. However, embodiments are possible with different diameters of the containers 14 and the corresponding scaling factor. In the preferred embodiment, the interface opening 30 is rectangular and has sides of approximately two inches by three and a half inches. The longer side is parallel to the bracket 16 and the indicia 20 running up the cylindrical rain container 14 to permit easy stacking of the cylindrical rain containers 14 side by side against a flat surface.

With this arrangement, the funnel shaped interface 12 is firmly mounted in sealing relationship to the inner wall of the container or body 14 and extends downwardly into it for a relatively smooth flow of rain water into the container or body 14. It is made of high impact plastic of any suitable type and has a general wall thickness of approximately one-sixteenth inch. A first rectangular tubular member 32 has a height of approximately one inch, a second tapered conical member 34 has a vertical dimension of approximately ⅝ inch and extends at an angle downward to a third cylindrical member 36. The third cylindrical member 36 has a length of approximately ½ inch and terminates at an inwardly extending cone shaped bottom pointing downward with pie shaped opening to allow water to pass downward through center and allowing the air to escape upward on the perimeter. In the preferred embodiment, the interface 12 may be inserted into the container or body 14 with a press fit manually. The press fit, of course, has some advantages in fabricating costs.

In the preferred embodiment, the bracket 16 has an upper or top support 40, and a lower or bottom support 24. The upper support 40 is a loop intended to pass around the outer circumference of the container or body 14 and the lower support 24 is a radial member with an upward end that supports and orients the container 14. The upper support 40 is sized so that the container or body 14 may slide into it and extend to the lower bottom support 24. The bottom support 24 fits within a pocket of the plug 22 and extends outwardly for alignment and holding purposes while the flat surface of the plastic plug 22 rests on the supporting end 24. The support strip 42 of the bracket 16 contains apertures 86 for fastener means to permit screw mounting to a flat surface for easy viewing.

Figure 2:
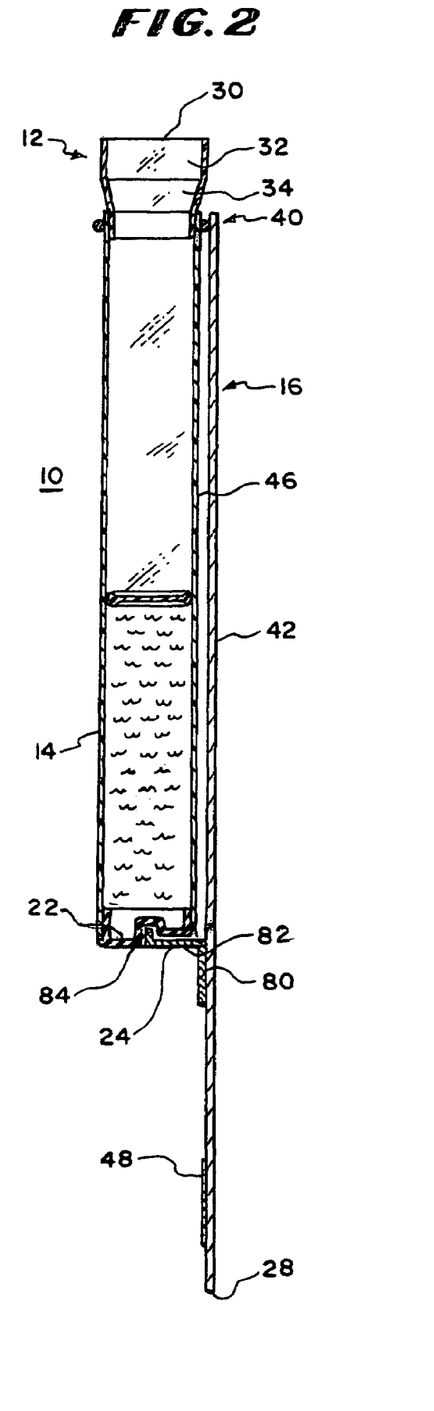
FIG. 2 is a side elevational view of the embodiment of FIG. 1.

In FIG. 2, there is shown a side elevational view of the rain gauge 10 more clearly showing the shape of the interface 12, the space 46 between the colored contrast stripe 26 (FIG. 1) on the support strip 42 of the bracket 16 and the surface of the container or body 14 and the manner in which the extending bottom support 24 holds the container or body 14 in place at the lower end. The interface 12 is shaped to have a parallelopiped first tubular member 32 at its top position so that the rain gauge can be laid flat for convenient packing. However, as shown in FIG. 1 and more clearly by a comparison between FIG. 1 and FIG. 2, the length of the interface opening 30 is elongated to provide the proper scaling factor between the opening 30 of the interface 12 and the opening of the cylindrical rain container 14.

The width of the space 46 between the closest surface of the cylindrical rain container 14 and the colored stripe 26 is particularly significant since it is intended to create an image of the colored stripe 26 at the diameter of the cylindrical rain container 14 that is substantially the width of the entire cylindrical rain container 14. In this specification, "by substantially the entire cylindrical rain container" means at least 80 percent of the diameter and preferably the entire diameter when viewed from the front. Thus the distance of the space 46 along with the width of the vertical stripe 26 are factors that determine the amount of magnification at the diameter of the cylindrical rain container 14 along with other factors such as the internal diameter of the cylindrical rain container 14 which contains the rain water and the relative indexes of refraction of the cylindrical rain container 14 filled with water and the cylindrical rain container 14 that is not filled with water. In this specification, the term "effective refractive index" refers to a refractive index which provides the same magnification of light hitting the cylindrical rain container 14 and caused by the refractive index and thickness of the wall of the cylindrical rain container 14 plus the refractive index and diameter of the filled portion of the cylindrical rain container 14 as though the cylindrical rain containers 14 were continuous with the same refractive index. From the viewpoint of coloring the cylindrical rain container 14, the half of the cylindrical rain container 14 facing the colored stripe 26 acts as a convex magnifier and the distance and the magnifier are designed to cause a substantial magnification of the colored stripe 26 to substantially fill the diameter of the cylindrical rain container 14 along a plane parallel to the stripe 26 and the bracket 16 so that a viewer will view an image of the colored stripe 26 that substantially fills the cylindrical rain container 14 up to the surface of the water but only a narrow stripe 26 above the surface of the water.

The distance of the space 46 and the width of the colored stripe or bracket can be arrived at by trial and error or calculated from the thick lens formula. Generally, the distance should be such as to put the colored stripe 26 between the focal point and the back of the cylindrical rain gauge container, treating the container 14 of the rain gauge 10 as a biconvex lens. With this arrangement, the light from the colored stripe 26 is substantially collimated to provide an image in magnified form. For purposes of calculating the focal point, the water-filled portion is most significant. Its index of refraction is substantially the index of refraction of an air to water transition whereas the unfilled portion is air to air with a minor change caused by the thin walls of the plastic. There is substantially no magnification in the unfilled portion and substantial magnification in the filled portion.

The distance of the contrast stripe 26 from the central vertical axis of the rain container 14 is related to the width of the stripe 26 and the radius of curvature of the walls of the cylindrical rain container 14. It is positioned between the focal point and the water wall of the cylindrical rain container 14 at a distance that causes the image of the stripe 42 to substantially equal the diameter of the wall of the cylindrical rain container. In the preferred embodiment, the image should equal at least 80 percent of the diameter of the column.

Figure 3:
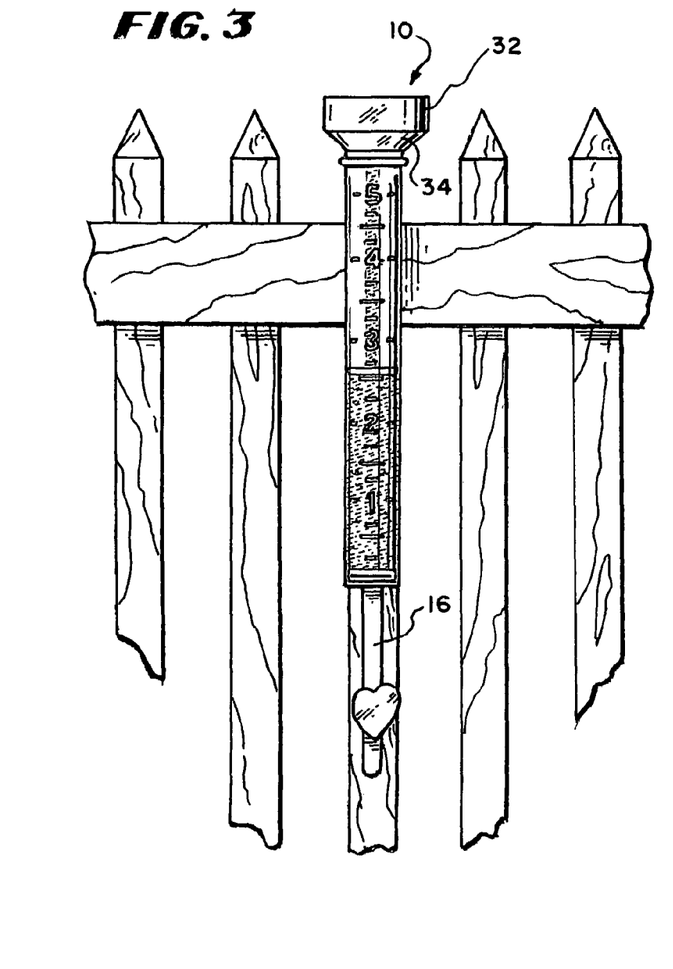
FIG. 3 is an elevational view of the rain gauge as attached to a fence.
Figure 4:
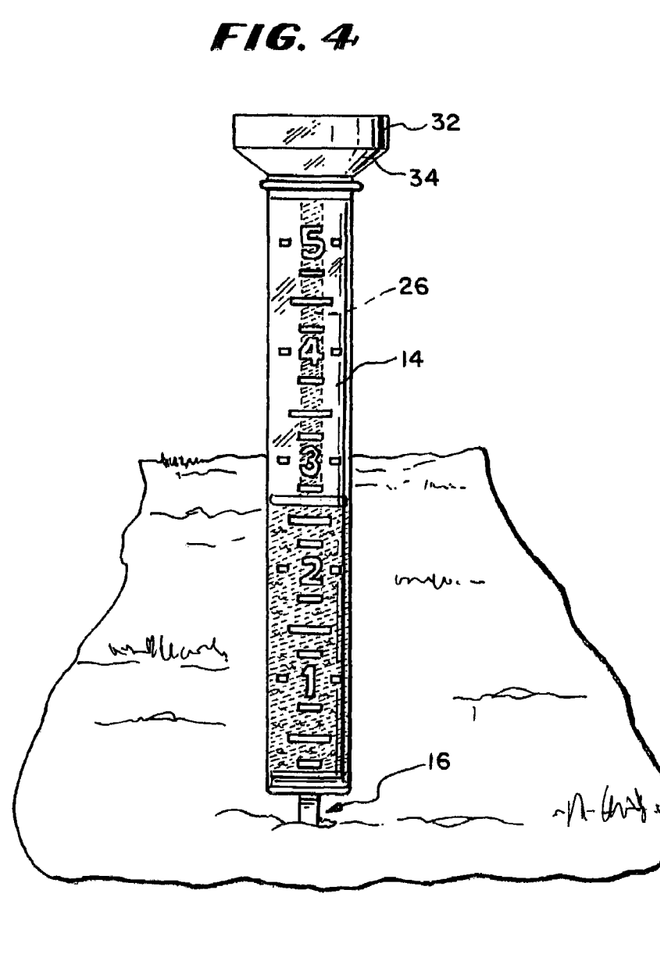
FIG. 4 is an elevational view of the rain gauge inserted in the ground.

In FIGS. 3 and 4, there are shown two different ways in which the rain gauge may be mounted. In FIG. 3, there is shown a rain gauge 10 as it may be mounted to a fence or any other surface. Holes or openings 86 (not shown in FIG. 3, shown in FIG. 15) in the bracket 16 permit fastening of the bracket by screws or nails or any other type of fastening. In FIG. 4, there is shown a front elevational view of the rain gauge 10 inserted into the surface of the ground by inserting the pointed end into the ground.

Figure 5:
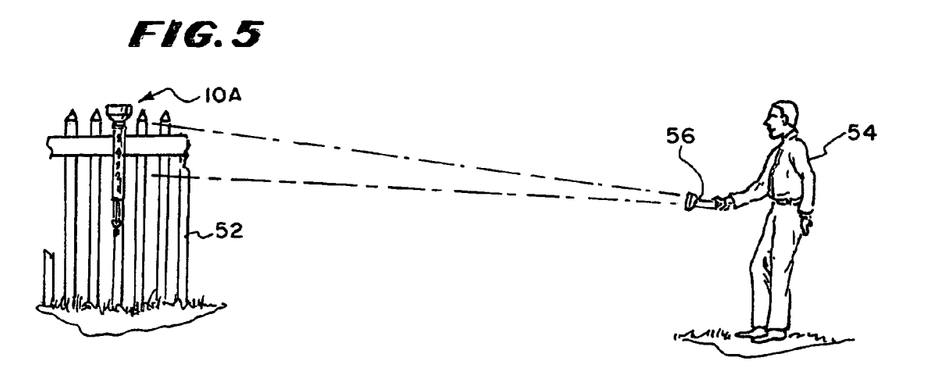
FIG. 5 is a perspective view of the rain gauge as it may be used at night.

In FIG. 5, there is shown another embodiment of rain gauge 10A fastened to a flat surface such as the fence 52. In this embodiment, instead of a normal non-reflective colored contrast stripe, a contrast stripe with a reflective surface is used. The reflective surface may be colored or silvered. With this arrangement, the reflected light fills the cylindrical rain container in the portion where there is water in the same manner that it is colored with a non-reflective colored surface. However, a person 54 shining a light from any type of a lamp such as a flashlight 56 causes illumination of the water-filled portion to enable the reading of the water level in the dark.

Figure 6:
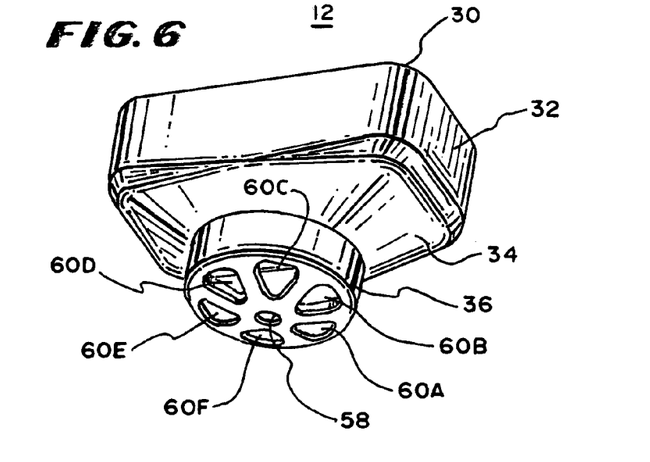
FIG. 6 is a perspective view of the interface of the rain gauge of FIG. 1.
Figure 7:
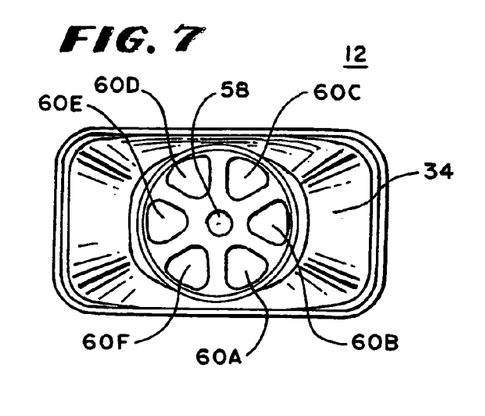
FIG. 7 is a bottom view of the interface of the rain gauge of FIG. 6.
Figure 8:
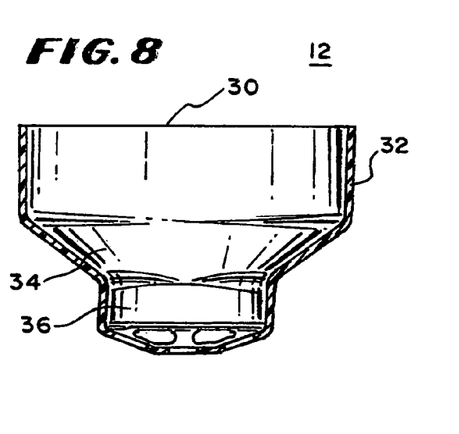
FIG. 8 is an elevational view of the interface of the rain gauge of FIG. 6.

In FIG. 6, there is shown a perspective view of the interface 12 having an interface opening 30, a tubular section 32, a conical section 34 and a cylindrical section or fitting 36. The tubular section 32 in the preferred embodiment is shaped as a parallelopiped. As best shown in FIGS. 7 and 8, tubular section 32 has a square cross-section to lie flat against other flat surfaces. In the preferred embodiment, it has a length of 3.38 inches and a width of 1.86 inches. The conical section 34 is a transition between the tubular section 32 and the fitting 36. Because in the preferred embodiment a substantially cylindrical shape is chosen, the funnel adjusts to the cylindrical shape of the cylindrical section or fitting 36. However, if a non-tubular configuration were to be selected for the container, then the funnel would accommodate the transition between the funnel into the top of the container to close the container.

At the bottom of the terminating cylindrical section or fitting 36 entering into the container 14, are a plurality of openings 58 and 60A-60F sized and positioned to permit the water in a heavy rain to flow freely into the container 14 and to permit air to escape from the container 14. The size and position of the openings 58 and 60A-60F avoid overflowing of rain from the interface 12. For this purpose, at least one of the openings is lower than the others. In the preferred embodiment, the central opening 58 of the circular cross section is in the center of the terminating cylindrical section or fitting 36 and six larger openings 60A-60F are shown at a higher elevation slanted upwardly. With this arrangement, air can escape from the upper portions while the liquid is flowing through the lower portions to avoid clogging by air bubbles or the like. As best shown in FIG. 8, the angle of section 34 is angled to join section 32 and 36 and section 36 has roughly vertical sides forming a cylinder while the tubular section 32 also has vertical sides but are shaped as a parallelopiped although they could be shaped elliptically or be any other shape that would accommodate easy packing and display.

Figure 9:
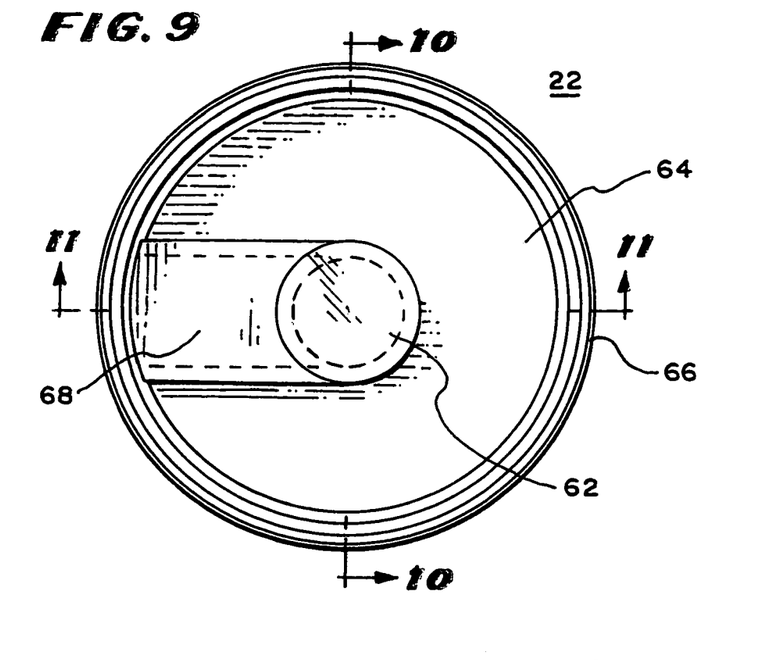
FIG. 9 is a plan view of a plug in accordance with the embodiments of FIGS. 1 and 2.
Figure 10:
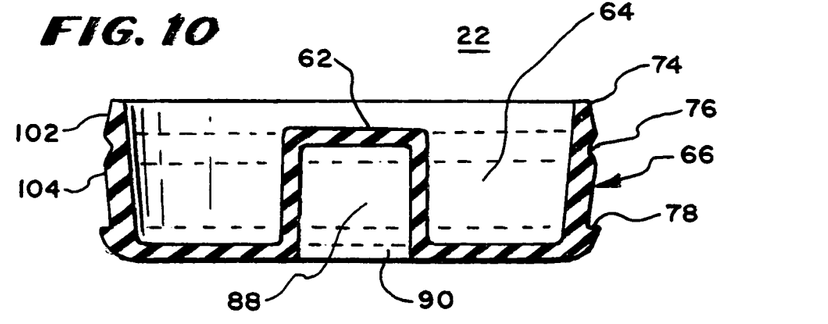
FIG. 10 is a sectional view through lines 10-10 of FIG. 9.
Figure 11:
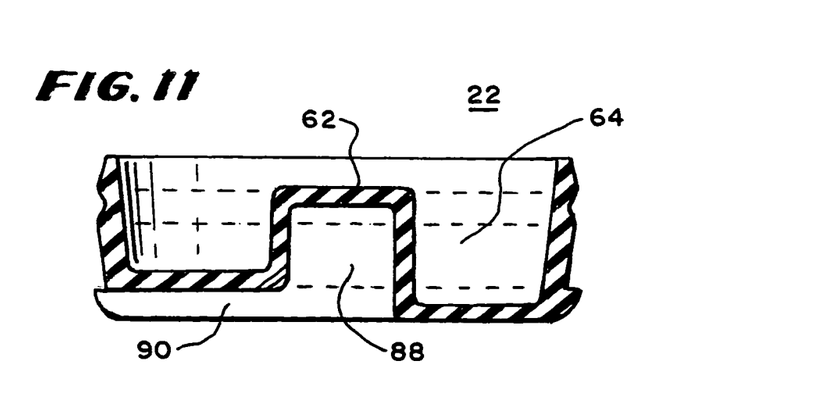
FIG. 11 is a sectional view through lines 11-11 of FIG. 9.

In FIG. 9, there is shown a plan view of the plug 22 having a central hollow raised portion 62 surrounded by an annular recessed portion 64 terminating in plug sidewalls 66 and a radial raised portion 68. As best shown in FIGS. 10 and 11, a hollow interior 88 in the bottom of the plug 22 formed by the central hollow raised portion 62 communicates with a groove or recess 90 formed in the bottom of the plug 22 by the radial raised portion 68 (FIG. 9). The radially extending recessed portion 90 (FIG. 10 and FIG. 11) formed by the raised portion 68 extends from the central hollow interior 88 to the outer periphery of the plug 22. The outer wall 66 has an outer diameter sized for a press fit into the cylindrical container wall with grooves 76 in it to form a better seal. The two ribs 102 and 104 around the circumference of the plug are of a sufficiently large diameter to stretch the polycarbonate tube so that the tube conforms to the ribs 102 and 104. This design is taking advantage of the tensile strength, elasticity, creep modulus and relaxation modulus of the polycarbonate tube to create a positive, long lasting seal to the plug. The recess 90 accommodates a radial section 82 (FIGS. 13 and 14) of bottom support 24 and the hollow interior 88 accommodates the ear 84 (FIGS. 13 and 14) of the bottom support 24. The radial section 82 and recess 90 are positioned with respect to the indicia markers 20 (FIG. 1) so that the markers must always face outwardly to be visible. For this purpose, the recessed portion 90 extends radially directly toward the support strip 42 (FIGS. 1 and 2) to point directly in the opposite direction of the indicia markers 20.

In the preferred embodiment, the plug 22 as best shown in FIGS. 10 and 11 has an outer diameter slightly larger than the inner diameter of the cylindrical rain container 14 and has an annular bottom ledge or shoulder 78 that receives the end of the cylindrical wall of the rain container 14, a circumscribing groove 76 and a tapered end 74. There is a cylindrical portion of the plug between the groove 76 and the shoulder 78. With this construction, the shoulder 78 is pressed tightly against the end of the cylindrical tube of the rain container 14 to form a durable tight seal without the need for an "O" ring or gasket. This seal is economically molded and less subject to leakage with time. The plug 22 is sufficiently resistant to compression so as to stretch the polycarbonate wall of the cylinder 14. The wall 14 resists taking a set with time and thus resists loosening and leakage with time.

Figure 12:
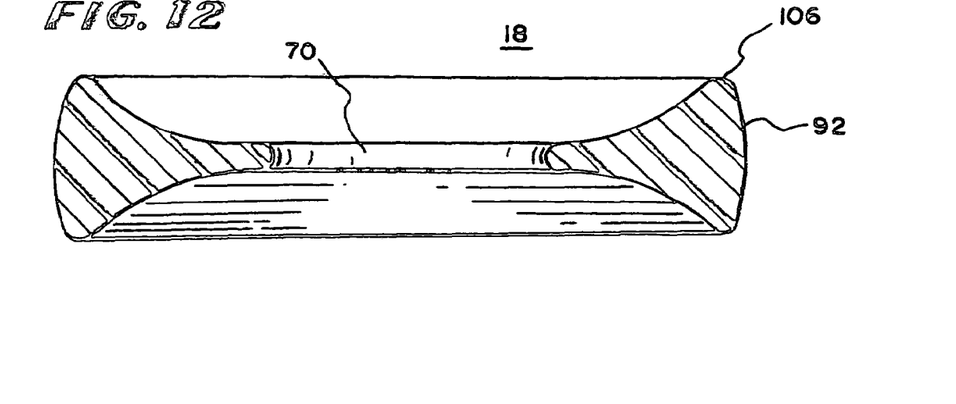
FIG. 12 is a sectional view of a float which may be used in the embodiment of FIG. 1.

In FIG. 12, there is shown a sectional view of a polypropylene float 18 having a central opening 70, an outer curved rim 92 and sloping curved surfaces 106 from the rim 92 to the opening 70. With this arrangement, most of the float is below water and only the thin rim extends out of the water with a wide rim 92 against the transparent wall of the rain container 14. Because the polypropylene has a specific gravity of 0.9 and the water has a specific gravity of one, a portion of the float equal to one tenth of the weight of the float extends out of the water. With this configuration, the float 18 is generally centered at the surface with sloping curved surfaces 106 to the central opening 70 to permit debris and water to easily flow beneath the float 18 and air to escape above the float.

Figures 13, 14:
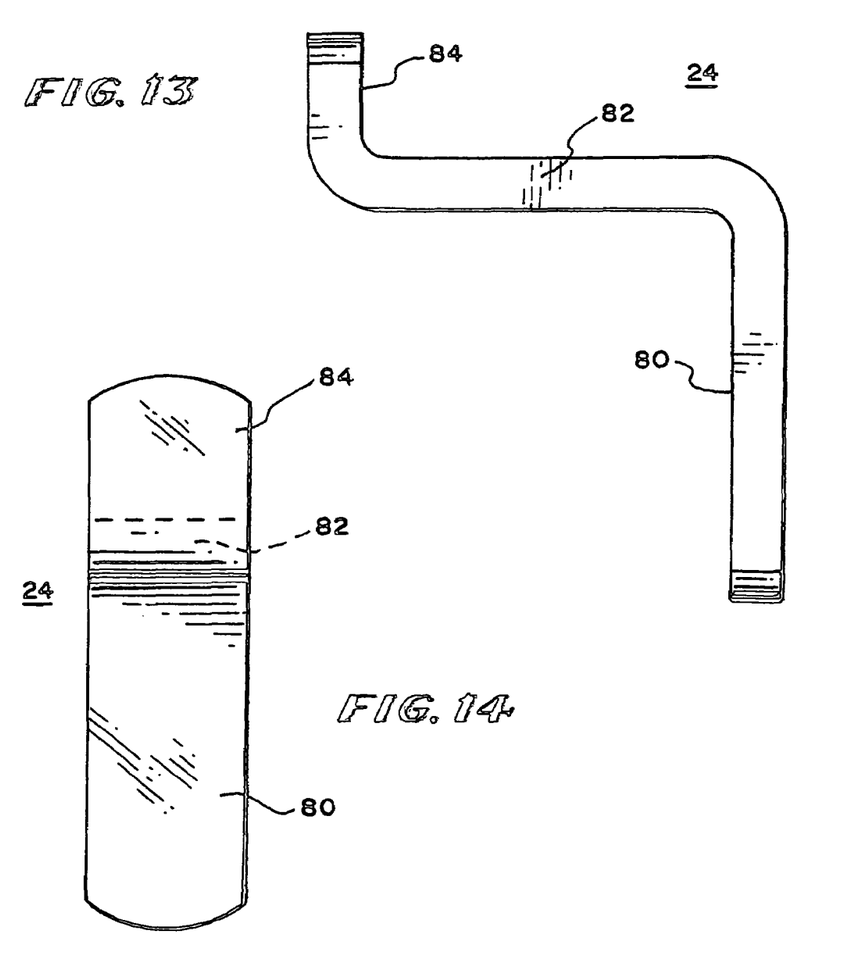
FIG. 13 is a bottom support which may be used in the embodiment in FIG. 1.
FIG. 14 is a front view of the embodiment of FIG. 13.
Figure 15:
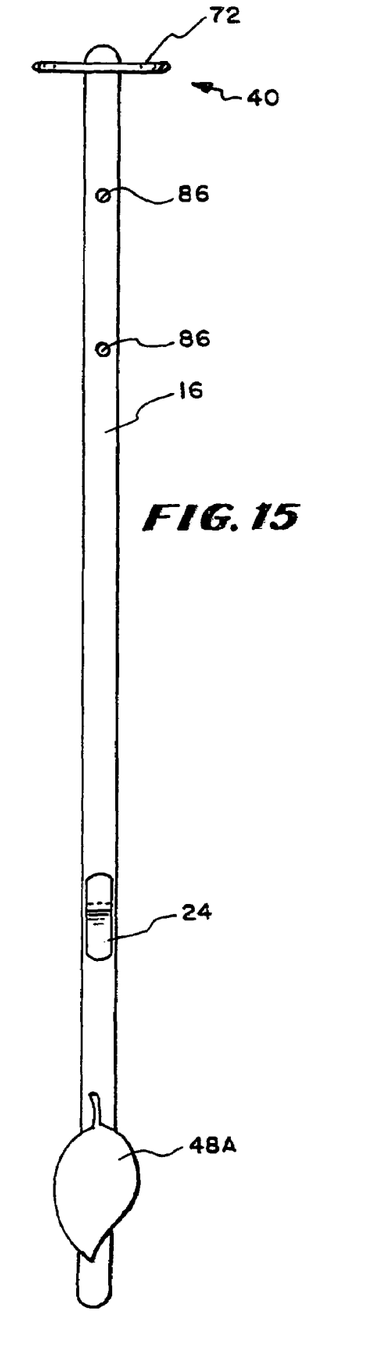
FIG. 15 is an elevational view of a bracket used in the embodiment of FIG. 1.
Figures 16, 17:
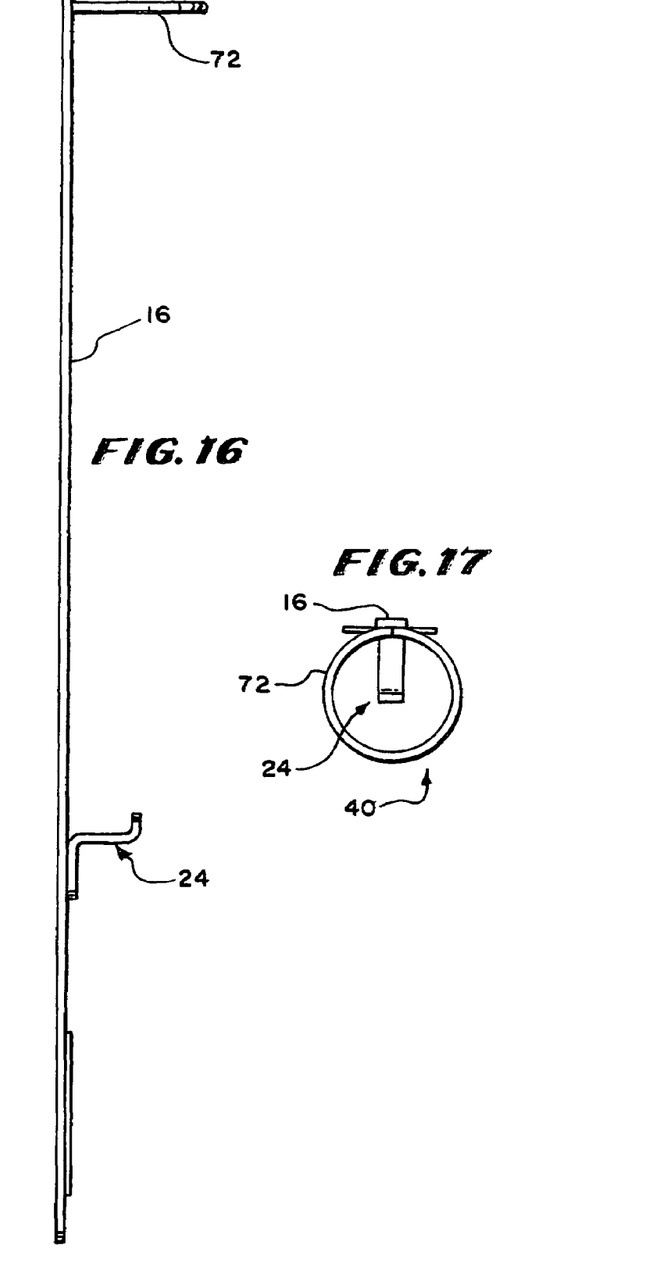
FIG. 16 is a side elevational view of the bracket of FIG. 15.
FIG. 17 is a top support for the embodiment of FIG. 1.

In FIG. 13, there is shown a side elevational view of the bottom support 24 having a bracket section 80, a radial section 82 and an upwardly extending ear 84. As best shown in FIG. 14, the bracket section 80, the radial section 82 and the upwardly extending ear 84 are formed of flat members with a thickness of 125 thousandths and a width of 380 thousandths in the preferred embodiment. As best shown in FIG. 2, the bracket portion 80 is fastened to the bracket 16 such as by welding, the radial section extends outwardly to fit within the recess 90 (FIGS. 10 and 11) of the plug 22 and the ear 84 extends into the opening 88 (FIGS. 10 and 11). With this arrangement, the rain gauge 14 can be lowered into the bottom support 24 through the upper support 40 and will automatically be oriented by the bottom support 24 so that the indicia 20 (FIG. 1) faces outwardly. In FIGS. 15, 16 and 17, the bottom support 24 and the top support 40 are shown mounted to the bracket 16. The top support 40 is a ring 72 sized to receive the rain container 14 (FIGS. 1 and 2) and fastened such as by welding to the bracket 16.

Figure 18:
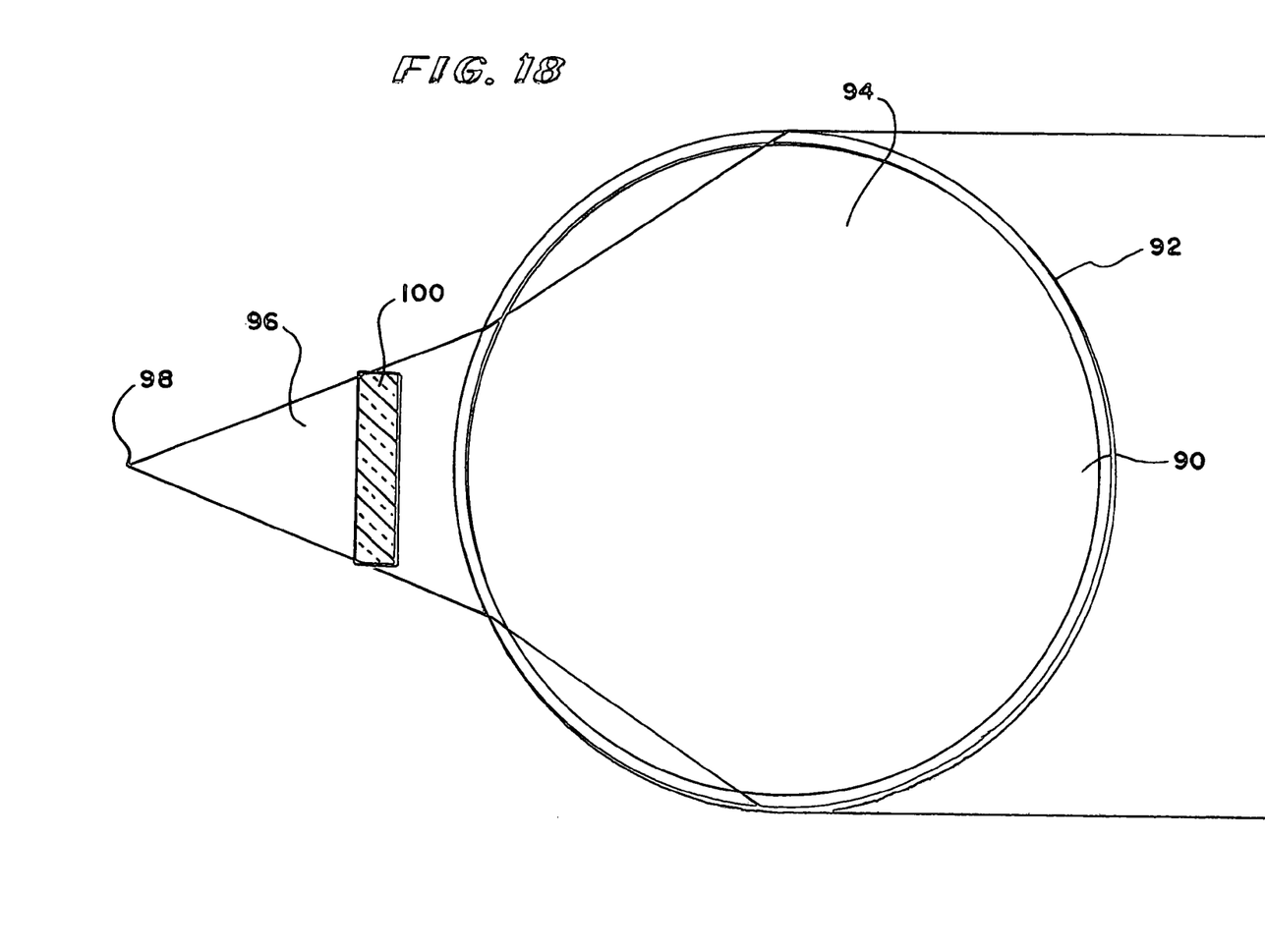
FIG. 18 is a diagram illustrating a principle used in an embodiment of the invention.

In FIG. 18, there is shown a simplified diagram illustrating the operation of one embodiment of the invention having a tubular cylinder 92 which, when filled with water, forms a solid cylindrical biconvex lens 94. The focal plane 96 of the biconvex cylindrical lens on the opposite side of the lens from viewing has a width at the lens of about one half the diameter of the lens: this will vary due to the thickness and material of the cylinder forming the lens and the focal point 98 being at a distance from the center of the biconvex lens which nearly equals the diameter of the cylinder 90 that forms the lens. A colored object 100 that fills the focal plane at a distance is seen by the viewer as an object that totally colors the biconvex cylindrical lens 94. Therefore, from a practical standpoint the colored object 100 is placed closer to the back of the biconvex lens 94 than to the focal point. The colored object is a contrasting stripe parallel to the cylindrical lens with a width that equals the width of the focal plane and at that position it colors the lens when viewed from the opposite side. These relationships can be derived from the lens makers' formula for cylindrical lenses. Of course, an eliptical biconvex lens and a lens in which the polycarbonate water cylinder is thicker or of another material can be used and the lens makers' formula used to calculate the focal point and focal plane or other parameters as well.

In this specification, when a colored stripe is in front of the support bracket or on the support bracket such as being painted on and the support bracket is of sufficient size to support the rain gauge and permit mounting to a surface with the rain gauge being spaced so that the image of the stripe occupies at least 80 percent of the diameter of the column over the area filled with water to form a biconvex lens, the spacing and size of the stripe with respect to the column is referred to in this specification as an effective configuration.

From the standpoint of the gauge design, the stripe must be located within the focal plane of the biconvex lens and have a width at that point that equals the width of the focal plane. The colored bracket or vertical line is placed between the cylinder containing water and the focal point of light that passes through the cylinder containing water at a point where the width of the bracket equals the width of the light rays forming the focal point. Thereby, the reflected light off of the colored bracket or vertical line following the same path outward causes the water contained in the cylinder to appear the same color as the bracket or vertical line. The distance of the bracket from the cylinder is sized to minimize its appearance when viewed through the cylinder without water.

From a practical standpoint, the location of the stripe should be as close to the rain gauge as possible. In locating the position, the image of the stripe should fill the rain filled gauge when viewed from the front of the gauge but in the area of the gauge above the rain collected, the stripe should be far enough back and of a narrow enough width to reduce its visibility.

Although a preferred embodiment of the invention has been described with some particularity, many modifications and variations of the invention are possible within the light of the above teachings. Therefore, it is to be understood, if in the scope of the appending claims, the invention may be practiced other than as specifically described.

What is claimed is:

1. A rain gauge having a front viewing surface and a rear surface comprising:
   a rain collector having an open top for receiving rain, walls for forming a vessel for holding the rain that falls through the open top; and indicia positioned at different heights to indicate the amount of rain that has fallen;
   a portion of said walls being formed of light passing material and having a curved inner surface with a radius of curvature, an outer surface and a vertical central axis to form a biconvex lens when containing rain; and
   a contrast stripe positioned between a focal point of the biconvex lens and the outer surface to form an effective configuration.

2. A rain gauge in accordance with claim 1 in which the distance from the central axis of the biconvex lens to the focal point is substantially equal to the diameter of the biconvex lens.

3. A rain gauge in accordance with claim 1 further including a mounting bracket; said contrast stripe being an integral part of said mounting bracket and being distinctively colored.

4. A rain gauge in accordance with claim 1 in which the contrast stripe has a distinctive color and is positioned adjacent to the rear surface of the rain gauge.

5. A rain gauge in accordance with claim 1 wherein the biconvex lens is created when rain is contained within a cylinder; the contrast stripe is vertical, distinctly colored, has a width of about ¼ that of the diameter of the cylinder and is spaced out from the cylinder about ⅓ the width of the distinctive colored contrast stripe.

6. A rain gauge in accordance with claim 3 wherein the mounting bracket has a width equal to the distinctive colored contrast stripe and extends the length of a cylinder.

7. A rain gauge in accordance with claim 3 wherein the mounting bracket provides a means for retention of the cylinder.

8. A rain gauge in accordance with claim 3 wherein the mounting bracket has a ring at the top and a support at the bottom of the cylinder for retention of the cylinder.

9. A rain gauge in accordance with claim 8 wherein the support has an ear that engages into the bottom of a closed base of the cylinder and the support engages in a hollow interior at the base to orient the cylinder on the mounting bracket.

10. A rain gauge in accordance with claim 3 wherein the mounting bracket extends down from the lower end of the cylinder for use as a stake for installing and locating the rain gauge.

11. A rain gauge in accordance with claim 1 wherein said biconvex lens is formed by a cylinder filled with rain water; said contrast stripe extends the length of the cylinder and is located on an opposite side from the side on which a scale is viewed on the cylinder; said stripe being sized in width and spaced in distance from the cylinder to make the rain collected appear to take on the color of the stripe on the bracket due to the magnification of the stripe on the bracket when viewed through the rain collected in the cylinder.

12. A rain gauge in accordance with claim 1 wherein the biconvex lens is formed by a cylinder filled with rain water, the cylinder has an expanded scale which is directly proportional to an increased area of a rain collector opening at the top of the clear cylinder to that of the cross sectional area of the inside diameter of the cylinder.

13. A rain gauge in accordance with claim 1 wherein the contrast stripe has a reflective surface that is readily visible when illuminated.

14. A rain gauge in accordance with claim 11 wherein the open top is rectangular and part of an interface that catches the rain and guides it to the cylinder.

15. A rain gauge according to claim 1 wherein the contrast stripe is positioned at a distance between the focal point of the biconvex lens created by rain water collected in a cylinder and the nearest wall of the cylinder to give the appearance of color to water in the rain gauge.

16. A rain gauge in accordance with claim 1 wherein the contrast stripe is vertical and has a width sufficient to permit the contrast stripe to fill the focal plane of the biconvex lens created by rain water collected in a cylinder and is within twenty percent of the focal length from the biconvex lens.

17. A rain gauge in accordance with claim 1 wherein the walls form a cylinder with a wall thickness no greater than 15 percent of that of the diameter of the cylinder for the retention of fluid, and the contrast stripe being colored, parallel to the length of the cylinder and set off from the cylinder opposite to a side for viewing so that when the rain water collected in the cylinder is viewed from the side opposite to the contrast stripe, the rain water appears to take on the color of the contrast stripe.

18. A gauge in accordance with claim 1 wherein a cylinder when containing rain water is a biconvex lens.

19. A rain gauge in accordance with claim 14 wherein the interface includes a parallelopiped with a rain catching opening that is rectangular and wherein the shortest dimension of the rectangle is front to back.

20. A method of measuring rainfall, comprising the steps of:
collecting rain water in a rain collector having an open top for receiving rain, light passing walls for forming a vessel for holding the rain that falls through the open top; and indicia positioned at different heights to indicate an amount of rain water that has fallen; and
transmitting a magnified image of a contrast stripe through a portion of the vessel containing rain water whereby the height of the rain water is shown as a magnified image of distinctive color.

21. A method of measuring rainfall in accordance with claim 20 wherein the step of collecting rain water includes the step of collecting rain in a container having walls shaped as a cylindrical biconvex lens when filled with water.

22. A method of measuring rainfall in accordance with claim 20 wherein the step of transmitting a magnified image of a distinctive contrasting color through a portion of the vessel containing rain water includes the step of transmitting a magnified image of a contrast stripe positioned a distance from a central axis of the vessel equal to the radius of curvature of an inner surface of the vessel walls divided by a number in the range of 0.7 to 0.9.

23. A method of measuring rainfall in accordance with claim 20 wherein the step of transmitting a magnified image of a distinctive contrasting color stripe comprises the step of:
collimating light from an image of a distinctive contrasting color stripe through a portion of the vessel containing rain water whereby the height of the rain water is shown as a magnified image of distinctive color.

24. A rain gauge having a front surface and a rear surface comprising:
a rain collector having an open top for receiving rain and cylindrical walls formed of light passing material;
indications indicating the height of water in the rain collector, a rain interface with a rain collecting opening;
said rain collecting opening being rectangular so as to reduce the volume in shipping.

25. A rain gauge in accordance with claim 24 having one dimension of said rectangle longer than the other and adjusted with respect to a cross sectional area of the rain collector so that the length of the rain collector may be elongated to accommodate larger indicia of rainfall.

26. A rain gauge having a rain collection section;
said rain collection section being formed of a material having a modulus of creep and a modulus of relaxation that are at least 75 percent of the modulus of creep and modulus of relaxation of infrared resistant polycarbonate;
a plug sealing the bottom of cylindrical walls;
said plug having an interference fit.

27. A rain gauge in accordance with claim 26 in which said plug has at least one circular rim extending outwardly whereby said rim stretches said cylindrical walls.

28. A rain gauge in accordance with claim 26 in which said cylindrical walls are infrared resistant polycarbonate.

29. A rain gauge comprising:
a rain interface;
a rain collector;
said rain collector including indicia for indicating the height of rain water collected;
said interface including a downward opening into said rain collector and upward walls for receiving rain in a fixed area and permitting rain to flow into an opening of said rain collector;
a lower open end of said rain collector receiving section having a plurality of openings;
at least one of said plurality of openings being located lower than any other portion of openings, whereby water may flow through a deeper opening while air escapes through upper openings.

30. A rain gauge in accordance with claim 29 in which said openings form a ring of openings with said openings being at an angle to the longitudinal axis of the rain gauge whereby water may flow through a lower portion of said openings while air flows outwardly through an upper portion of said ring of openings.

31. A rain gauge in accordance with claim 30 in which said ring of openings are larger at a higher height than at a lower height so that the openings occupy a substantial portion of a connecting section between the interface and the rain collector.

32. A rain gauge in accordance with claim 1 wherein the biconvex lens is formed from a cylinder filled with rain further comprising:
a rain interface;
said open top being rectangular and part of said rain interface, wherein said rain interface catches the rain and guides it to the cylinder forming rain collector;
the rain interface including a parallelopiped with a rain catching opening that is rectangular wherein the shortest dimension of the rectangle is front to back;
said rain interface including a downward opening into said rain collector and upward walls for receiving the rain in a fixed area and permitting the rain to flow into an opening of said rain collector;
a lower open end of a rain collector receiving section having a plurality of openings;
at least one of said plurality of openings being located lower than any other portion of openings, whereby water may flow through a deeper opening while air escapes through upper openings;
said upper openings form a ring of openings surrounding said lower plurality of openings with said upper openings being at an angle to a longitudinal axis of the rain gauge whereby the water may flow through a lower portion of said plurality of openings while air flows outwardly through an upper portion of said ring of openings; and
said ring of openings are larger at a higher height than at a lower height so that the ring of openings occupy a substantial portion of a connecting section between the rain interface and the rain collector.

33. A rain gauge in accordance with claim 1 wherein a rain collection section is formed of a material having a modulus of creep and a modulus of relaxation that are at least 75 percent of the modulus of creep and modulus of relaxation of infrared resistant polycarbonate;
said rain gauge further comprising a plug;
said plug being sized and positioned to seal the bottom of cylindrical walls;
said plug having an interference fit with the cylindrical walls;
said plug having at least one circular rim extending outwardly whereby said rim stretches said cylindrical walls; and
said cylindrical walls being infrared resistant polycarbonate.

34. A rain gauge having a front viewing surface and a rear surface comprising:
- a rain collector having an open top for receiving rain, walls for forming a vessel for holding the rain that falls through the open top; and indicia positioned at different heights to indicate the amount of rain that has fallen;
- a portion of said walls being formed of light passing material and having a curved inner surface with a radius of curvature, an outer surface and a vertical central axis to form a biconvex lens when containing rain;
- a contrast stripe positioned between a focal point of the biconvex lens and the outer surface to form an effective configuration;
- a mounting bracket;
- said contrast stripe being an integral part of said mounting bracket;
- said mounting bracket having a ring at the top and a support at the bottom of a cylinder for retention of the cylinder, wherein the support has an ear that engages into the bottom of a closed base of the cylinder;
- said support engaging in a hollow interior at the base to orient the cylinder on the mounting bracket;
- said mounting bracket extending down from the lower end of the cylinder for use as a stake for installing and locating the rain gauge;
- said open top being rectangular and part of an interface that catches the rain and guides it to form the biconvex lens;
- a rain interface;
- said rain interface including a parallelopiped with a rain catching opening that is rectangular and wherein the shortest dimension of the rectangle is front to back;
- said rain interface including a downward opening into said rain collector and upward walls for receiving rain in a fixed area and permitting rain to flow into an opening of said rain collector;
- a lower open end of a rain collector receiving section having a plurality of openings;
- at least one of said plurality of openings being located lower than any other portion of openings, whereby water may flow through a deeper opening while air escapes through upper openings;
- said openings form a ring of openings with said openings being at an angle to a longitudinal axis of the rain gauge whereby the water may flow through a lower portion of said openings while air flows outwardly through an upper portion of said ring of openings;
- said ring of openings are larger at a higher height than at a lower height so that the ring of openings occupy a substantial portion of a connecting section between the rain interface and the rain collector;
- said rain collector receiving section being formed of a material having a modulus of creep and a modulus of relaxation that are at least 75 percent of the modulus of creep and modulus of relaxation of infrared resistant polycarbonate;
- a plug sealing the bottom of cylindrical walls;
- said plug having an interference fit;
- said plug having at least one circular rim extending outwardly whereby said rim stretches said cylindrical walls; and
- said cylindrical walls being infrared resistant polycarbonate.

* * * * *